United States Patent
Gilson et al.

(10) Patent No.: US 10,432,494 B2
(45) Date of Patent: Oct. 1, 2019

(54) OPTIMIZING NETWORK EFFICIENCY FOR APPLICATION REQUIREMENTS

(71) Applicant: Comcast Cable Communications, LLC, Philadelphia, PA (US)

(72) Inventors: Ross Gilson, Philadelphia, PA (US); David Urban, Downingtown, PA (US); Albert Garcia, Wayne, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 8 days.

(21) Appl. No.: 15/409,083

(22) Filed: Jan. 18, 2017

(65) Prior Publication Data
US 2018/0205628 A1    Jul. 19, 2018

(51) Int. Cl.
| | |
|---|---|
| *H04L 12/26* | (2006.01) |
| *H04L 12/851* | (2013.01) |
| *H04W 28/02* | (2009.01) |
| *H04L 12/70* | (2013.01) |
| *H04W 24/02* | (2009.01) |

(52) U.S. Cl.
CPC ......... *H04L 43/0894* (2013.01); *H04L 47/00* (2013.01); *H04L 47/24* (2013.01); *H04W 28/0231* (2013.01); *H04L 43/0852* (2013.01); *H04W 24/02* (2013.01)

(58) Field of Classification Search
CPC .. H04W 28/0231; H04W 24/02; H04W 72/02
See application file for complete search history.

(56) References Cited

U.S. PATENT DOCUMENTS

| | | | | |
|---|---|---|---|---|
| 8,385,200 | B2* | 2/2013 | Rainer | H04M 15/00 |
| | | | | 370/232 |
| 9,185,643 | B2* | 11/2015 | Jouin | G06F 3/1438 |
| 2007/0177505 | A1* | 8/2007 | Charrua | H04L 45/12 |
| | | | | 370/230 |
| 2008/0109711 | A1 | 5/2008 | Morioka et al. | |
| 2013/0028104 | A1* | 1/2013 | Hui | H04L 45/48 |
| | | | | 370/252 |

OTHER PUBLICATIONS

"Orthogonal frequency-division multiplexing," [online], Wikipedia, (Updated Apr. 19, 2017), https://en.wikipedia.org/wiki/Orthogonal_frequency-division_multiplexing, Retrieved on Dec. 4, 2015.
Jun. 11, 2018—Partial European Search Report—EP 18152427.3.

* cited by examiner

*Primary Examiner* — Kevin C. Harper
(74) *Attorney, Agent, or Firm* — Banner & Witcoff, Ltd.

(57) ABSTRACT

Methods and systems for selecting routes from among multiple media and/or optimizing transmission across those media are described. A minimum data rate may be determined for transmitting a content item. Based on that minimum data rate, a device may determine whether to transmit the content item via a given medium, select a different medium for transmission, or adjust transmission to compensate for unfavorable network conditions. A device may select a medium based on ranking one or more routes from a content source to a user device. Further, a device may determine a data rate for transmission based on calculating an expected time of transmission that includes time spent performing retransmissions at a given data rate.

20 Claims, 8 Drawing Sheets

OPTIMIZING NETWORK EFFICIENCY FOR APPLICATION REQUIREMENTS

BACKGROUND

Improvements in network infrastructure have created new concerns for routing network traffic. Networks often have multiple paths for transmission, and applications often have requirements for both bandwidth and latency. Efficient methods and apparatus are needed for managing network traffic so that optimal routes may be selected based on those requirements.

SUMMARY

The disclosure describes managing network traffic, for example, by selecting optimal routes based on application requirements.

Some environments may present difficulties for network traffic. For example, a congested network may introduce delays in packet transmissions or may cause packets to be dropped. Further, an increasingly crowded wireless spectrum may cause interference that causes packets to be dropped. This may introduce undesirable network conditions, including latency or jitter that may affect usability. However, there are also increasingly varied media for packet transmission. A user device may have the option of receiving content via Ethernet connections, a local wireless network, a cellular network, a coaxial network, etc. The user experience may be improved and networks may be more effectively utilized by selecting routes from among multiple media or optimizing transmission across those media.

A minimum effective data rate may be determined for transmitting a content item. Based on that minimum data rate, a device may determine whether to transmit the content item via a given medium, select a different medium for transmission, or adjust transmission to compensate for unfavorable network conditions. A device may select a medium based on a method of ranking one or more routes from a content source to a user device. Further, a device may determine a data rate for transmission based on calculating an expected time of transmission that includes time spent performing retransmissions at a given data rate. Transmission adjustments, such as adjusting a modulation parameter based on application requirements, may be performed in response to application requirements, such as requirements for a minimum level of reliability or throughput.

This summary is not intended to identify critical or essential features of the disclosure, but merely to summarize certain features and variations thereof. Other details and features will be described in the sections that follow.

BRIEF DESCRIPTION OF THE DRAWINGS

Some features herein are illustrated by way of example, and not by way of limitation, in the figures of the accompanying drawings, in which like reference numerals refer to similar elements, and in which.

DETAILED DESCRIPTION

According to some aspects described herein, systems and methods may manage network performance by efficiently managing transmissions across one or more media. One or more routing devices may determine options for transmitting a content item along a route, as well as application requirements for the content item. Based on the application requirements and network conditions, the one or more routing devices may determine optimal path, medium, and/or other parameters for transmission. In many instances, multiple wired and/or wireless routes may exist for transmitting a content item from a source to a destination. By modifying transmissions to routes based on considerations for latency, bandwidth, and/or interference, the device may optimize the user experience while minimizing negative impacts to the network.

Figure 1:
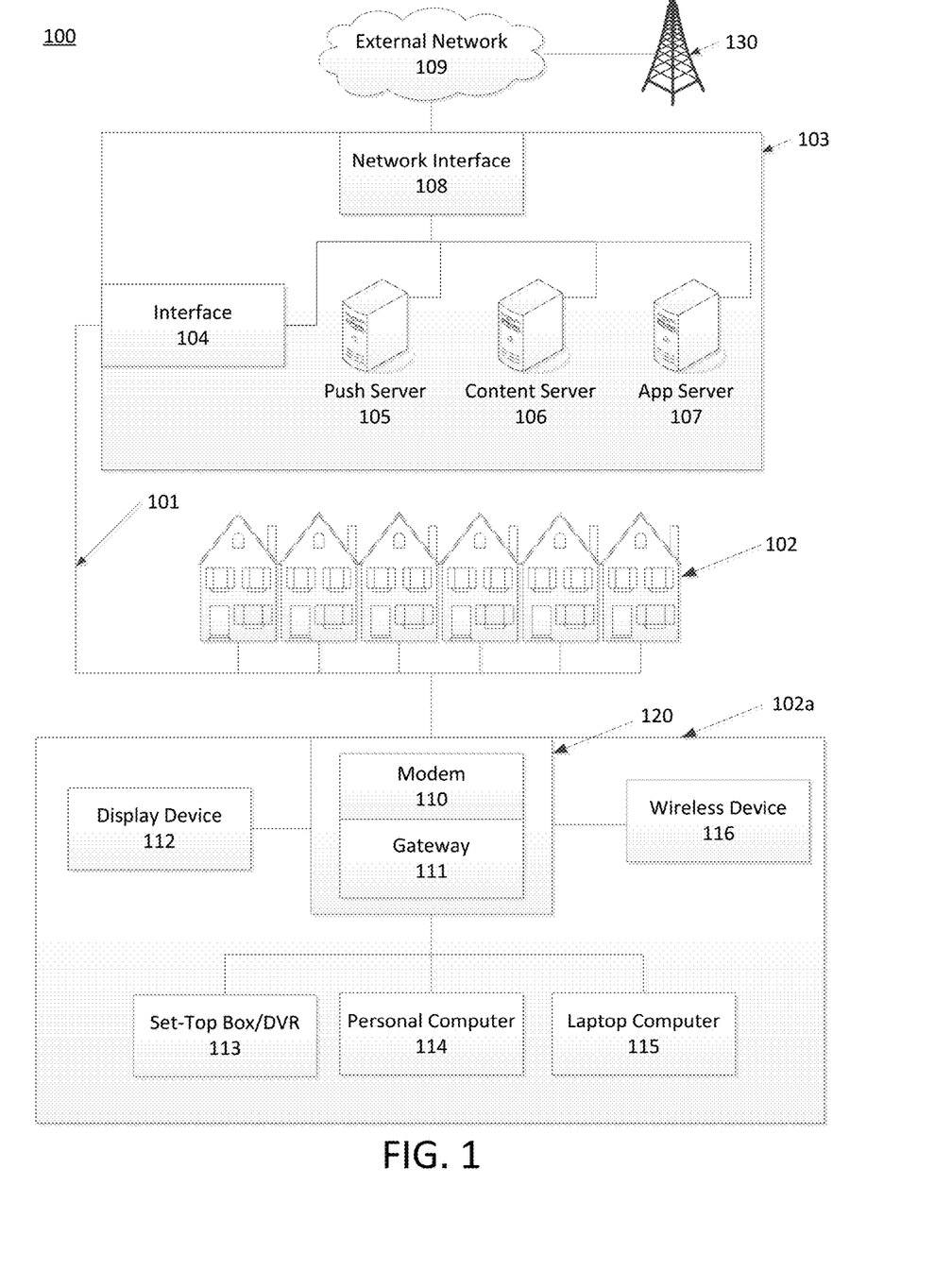
FIG. 1 shows an example network environment.

FIG. 1 illustrates an example information distribution network in which one or more of the various features described herein may be implemented. The illustrated information distribution network is only one example of a network and is not intended to suggest any limitation as to the scope of use or functionality of the disclosure. The illustrated network should not be interpreted as having any dependency or requirement relating to any component or combination of components in an information distribution network.

A network 100 may be a telecommunications network, a Multi-Service Operator (MSO) network, a cable television (CATV) network, a cellular network, a wireless network, an optical fiber network, a coaxial cable network, a Hybrid Fiber-Coaxial (HFC) network, or any other type of information distribution network or combination of networks. For example, the network 100 may be a cellular broadband network communicating with multiple communications access points, such as a wireless communications tower 130. In another example, the network 100 may be a coaxial system comprising a Cable Modem Termination System (CMTS) communicating with numerous gateway interface devices (e.g., a gateway 111 in an example home 102a). In another example, the network 100 may be a fiber-optic system comprising optical fibers extending from an Optical Line Terminal (OLT) to numerous Optical Network Terminals (ONTs) communicatively coupled with various gateway interface devices. In another example, the network 100 may be a Digital Subscriber Line (DSL) system that includes a local office 103 communicating with numerous gateway interface devices. In another example, the network 100 may be an HFC network in which Internet traffic is routed over both optical and coaxial communication paths to a gateway interface device in or near a user's home. Various aspects of the disclosure may operate on one or more of the networks described herein, or any other network architectures now known or later developed.

The network 100 may use a series of interconnected communication links 101 (e.g., coaxial cables, optical fibers, wireless links, etc.) to connect a premises 102 (e.g., a home or other user environment) to the local office 103. The communication links 101 may include any wired communication links, wireless communication links, communications networks, or combinations thereof. For example, portions of the communication links 101 may be implemented with fiber-optic cable, while other portions of the communication links 101 may be implemented with coaxial cable. The communication links 101 may also include various communications components such as splitters, filters, amplifiers, wireless components, switches, routers, and/or other components for communicating data.

The local office 103 may include an interface 104, which may be a computing device configured to manage communications between devices on the network of the communication links 101 and backend devices, such as a server. For example, the interface 104 may be a CMTS. The termination system may be as specified in a standard, such as, in an example of an HFC-type network, the Data Over Cable Service Interface Specification (DOCSIS) standard, published by Cable Television Laboratories, Inc. The termination system may be configured to transmit data over one or more downstream channels or frequencies to be received by various devices, such as modems in the premises 102, and to receive upstream communications from those modems on one or more upstream frequencies.

The local office 103 may include one or more network interfaces 108 for communicating with one or more external networks 109. The local office 103 may include a variety of servers that may be configured to perform various functions. The local office 103 may include a push server 105 for generating push notifications to deliver data, instructions, or both to devices that are configured to detect such notifications. The local office 103 may include a content server 106 configured to provide content (e.g., media content) to devices. The local office 103 may also include an application server 107.

The gateway 111 may be any computing device for communicating with the modem 110 to allow one or more other devices in the example home 102a to communicate with the local office 103, the one or more external networks 109, and/or other devices communicatively coupled thereto. The gateway 111 may include local network interfaces to provide communication signals to client devices in or near the example home 102a, such as a television 112, a set-top box 113, a personal computer 114, a laptop computer 115, a wireless device 116 (e.g., a wireless laptop, a tablet computer, a mobile phone, a portable gaming device a vehicular computing system, a mobile computing system, a navigation system, an entertainment system in an automobile, marine vessel, aircraft, etc.), or any other device. In some instances, the gateway 111 may be a wireless router and/or hotspot, which may be configured to provide service to one household and/or other users.

Figure 2:
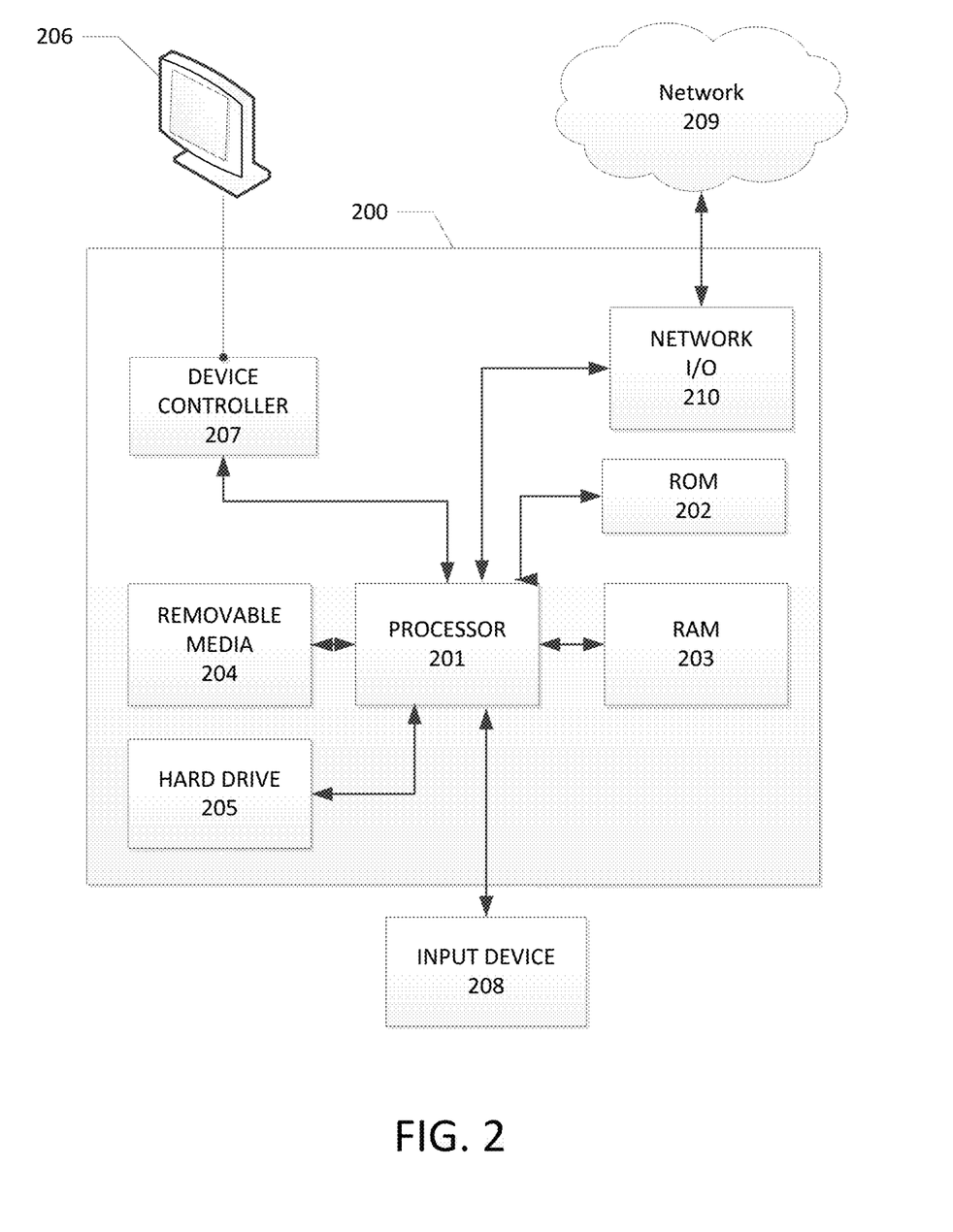
FIG. 2 shows an example software and hardware device.

FIG. 2 illustrates general hardware elements that can be used to implement any of the various computing devices, servers, encoders, caches, and/or software discussed herein. A device 200 may include a processor 201, which may execute instructions of a computer program to perform any of the functions and steps described herein. The instructions may be stored in any type of computer-readable medium or memory to configure the operation of the processor 201. For example, instructions may be stored in a Read-Only Memory (ROM) 202, a Random Access Memory (RAM) 203, a removable media 204, such as a Universal Serial Bus (USB) drive, Compact Disk (CD) or Digital Versatile Disk (DVD), hard drive, and/or any other desired electronic storage medium. Instructions may also be stored in a hard drive 205, which may be an internal or external hard drive.

The device 200 may include one or more output devices, such as a display 206 (e.g., an integrated or external display, monitor, and/or television), and may include a device controller 207, such as a video processor. In some embodiments, the device 200 may include an input device 208, such as a remote control, keyboard, mouse, touch screen, microphone, motion sensing input device, and/or any other input device.

The device 200 may also include one or more network interfaces, such as a network Input/Output (I/O) interface 210 to communicate with a network 209. The network interface may be a wired interface, wireless interface, or a combination of the two. In some embodiments, the network I/O interface 210 may include a cable modem, and the network 209 may include the communication links 101 shown in FIG. 1; the one or more external networks 109; an in-home network; a provider's wireless, coaxial, fiber, or hybrid fiber/coaxial distribution system (e.g., a DOCSIS network); and/or any other desired network.

Figure 3:
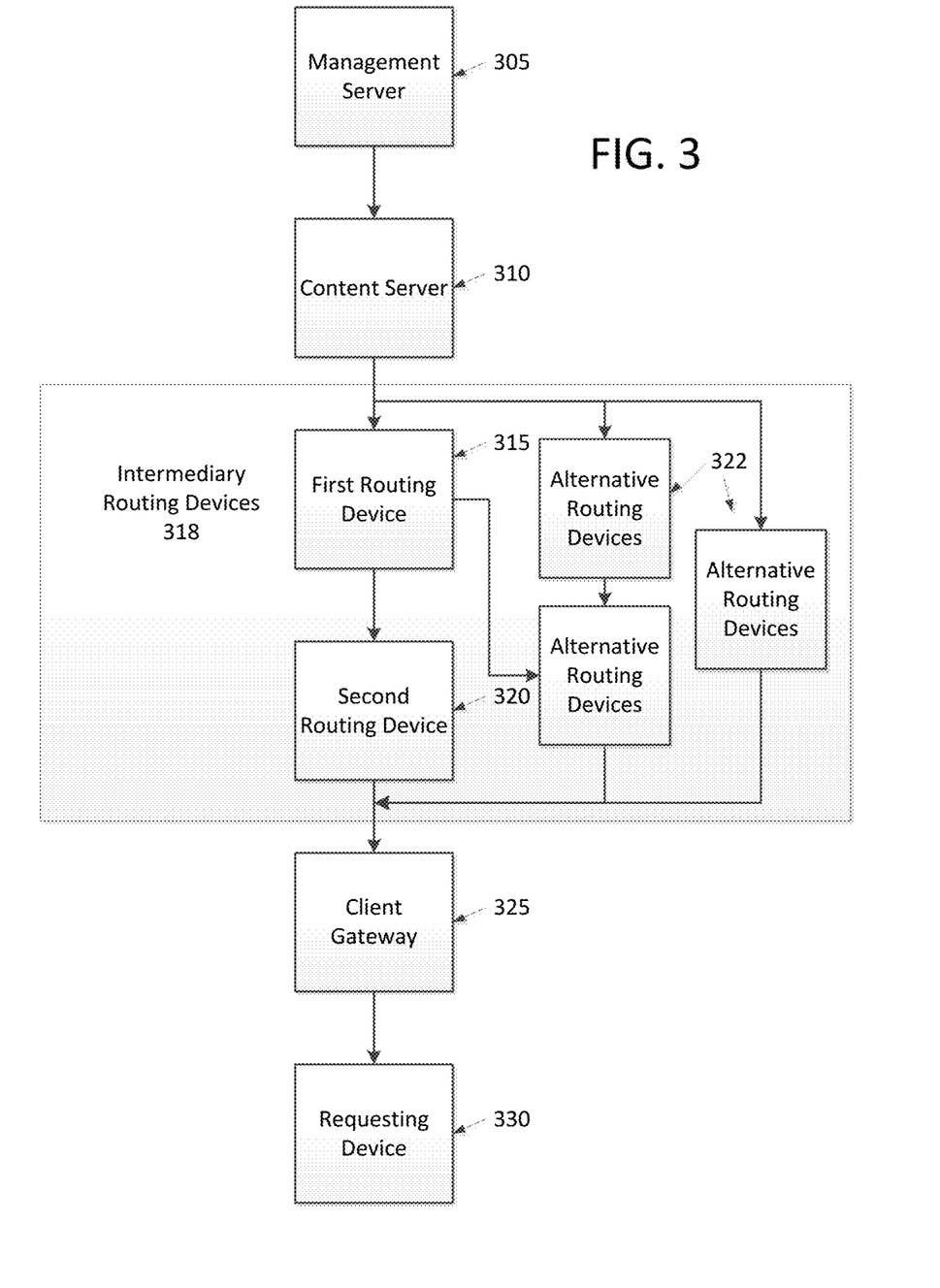
FIG. 3 shows an example device arrangement in a network.

FIG. 3 illustrates an example device arrangement in a network upon which one or more methods described herein may operate. A management server 305 may comprise a computing device 200 which may be configured to manage downstream devices. For example, a management server 305 may be a load balancing server that analyzes and instructs downstream routing devices in order to effectively manage bandwidth. In some instances, the management server 305 may determine which content server 310 will service a request for a content item on a given route to a requesting device 330. The management server 305 may receive a request to transmit a content item to the requesting device 330. For example, a user on a requesting device 330 (e.g., a computer, set-top box, mobile device, etc.) may trigger a request for a content item (e.g., a movie, web page, song, data file, multiplayer gaming data, etc.) from a content server 310 and/or a management server 305. In some instances, after receiving the request, the management server 305 may select a content server 310 and/or a route through devices 310-330 in order to efficiently deliver the content item. In other instances, a content server 310 may respond to the request directly. The management server may reside in the local office 103, and/or on the external network 109. Though FIG. 3 depicts an example device arrangement, numerous variations may be possible. For example, a management server 305 may sit downstream from the content server 310, and/or additional routing devices may exist between a management server 305 and a content server 310.

A content server 310 may hold content items for delivery to a requesting device 330. In some instances, the content server 310 may store a copy of content delivery on demand. There may also be multiple content servers 310 in the network, each storing copies so that multiple requests for the same and/or differing content may be serviced faster. The content server 310 may receive a request for a content item. The content server 310, in response to the request and/or an instruction from the management server 305, may then transmit the content item to the requesting device 330 via the devices 315-325. In some instances, the content server 310 may receive the request for the content item from the requesting device 330 and pass the request on to the management server 305 for the management server 305 to manage the delivery of the content item. The content server 310 may be a content server 106, or may reside on the external network 109.

A first routing device 315 may be an intermediary routing device between the content server 310 and the requesting device 330. In some instances, additional intermediary routing devices, such as a second routing device 320, may be downstream (i.e., closer to the requesting device 330). The intermediary routing devices, collectively, are referred to herein as intermediary routing devices 318. The intermediary routing devices may receive a content item at one device (such as from the content server 310 and at the first routing device 315), pass the content item along internally (such as from the first routing device 315 and to the second routing device 320), and then pass the content item on to the requesting device 330 (such as from the second routing device 320 and to the client gateway 325). The routing devices that comprise the intermediary routing devices 318 may be programmed according to one or more methods described herein, either independently or collectively. In some instances, each routing device of the intermediary routing devices 318 may receive individual instructions. In other instances, a single set of instructions may be given for a plurality of routing devices in the intermediary routing devices 318. The intermediary routing devices may exist on the external network 109, in the local office 103, and/or along the communication links 101.

The client gateway 325 may bridge a local network with a larger provider-operated network. In some instances, the client gateway 325 may be a gateway 111 and/or an interface 103. The client gateway may receive a request from a requesting device 330 and submit the request, using an external network connection, to a content server 310 or a management server 305. In some instances, the client gateway 325 may pass the request along intermediary routing devices 318. The client gateway 325 may also receive the content item from the external network and deliver it to the requesting device 330. In some embodiments, there may be no client gateway 325, and the requesting device 330 may interface directly with the external network. In other embodiments, the client gateway 325 may be contained in or may be attached to the requesting device 330.

The requesting device 330 may be a device that initiates a request for a content item. The requesting device 330 may be a computing device 200. The requesting device 330 may be a laptop computer, desktop computer, set top box, entertainment console, tablet, mobile device, server, workstation, and/or any device that may request content items from an upstream server. The requesting device 330 may initiate a request for a content item automatically or in response to input from a user. After initiating the request, the requesting device 330 may receive the requested content item from the content server 310.

Figure 4:
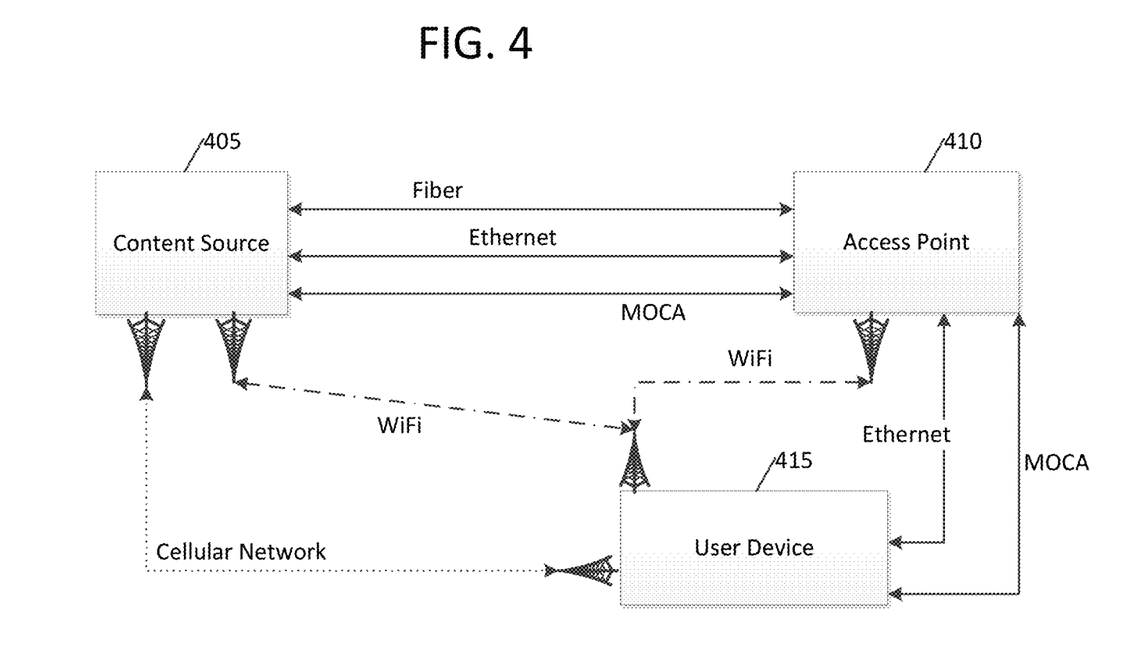
FIG. 4 shows an example environment with alternative routing paths upon which one or more methods described herein may operate.

FIG. 4 shows an example environment with alternative routing paths upon which one or more methods described herein may operate. A content source 405 may serve as a source for content requested by and/or transmitted to a user device 415. In some embodiments, a content source 405 may be a content server 310, and/or a user device 415 may be a requesting device 330. The content source 405 may connect to the user device 415 through one or more devices, such as an access point 410. The access point 410 may be an intermediary routing device 318 or a client gateway 325.

In other embodiments, FIG. 4 may depict a local network. A content source 405 may be a client gateway 325, and the user device 415 may be a requesting device 330. A request for a content item from a requesting device 330 may be passed through the client gateway 325. The content source 405 may send a request to an external network to retrieve a content item from the external network, before passing the content item on from the content source 405 to the user device 415. The content source 405 thus may be the source of the content item entering the local network, though it may obtain the content item from some other device in an external network. The access point 410 may be a routing device within the local network that may provide connections from the content source 405 to the user device 415.

Multiple pathways may exist for routing content items from a content source 405 to the user device 415. In some instances, traffic may pass through an intermediary device, such as the access point 410. Different connection types (e.g., "media") may be used for routing traffic from the content source 405 to the access point 410. For example, fiber optic connections, Ethernet connections, Multimedia over Coax Alliance (e.g., "MOCA") connections, and/or any other connection (including wireless connections) may be used to connect a content source 405 to an access point 410.

The access point 410 may have further media for relaying content items from the content source 405 to the user device 415. For example, the access point 410 may have a wireless network interface (WiFi), Ethernet connections, MOCA connections, and/or other connections to the user device 415. In some instances, traffic received by the access point 410 via one medium may be output via another. For example, a content item received over an Ethernet connection may be output via a WiFi connection.

In some instances, content items transmitted from a content source 405 to a user device 415 may bypass an access point 410. For example, a user device 415 may receive a content item via a WiFi connection to the content source 405. In another example, the user device 415 may receive the content item from the content source 405 via a cellular network connection.

FIG. 4 presents only one of many possible device arrangements. For example, in many instances, multiple intermediary devices may exist, such as routing devices between the content source 405 and the access point 410 and/or routing devices within a cellular network connecting the content source 405 and the user device 415. More or fewer connections may exist. For example, a cellular network may be used to connect the content source 405 to the access point 410, and only an Ethernet connection may exist between the access point 410 and the user device 415. In another example, many access points 410 may exist in parallel, offering alternative routes between the content source 405 and the user device 415. While only one illustrated example is given, many such variations may be compatible with the systems and methods described herein.

Figure 5:
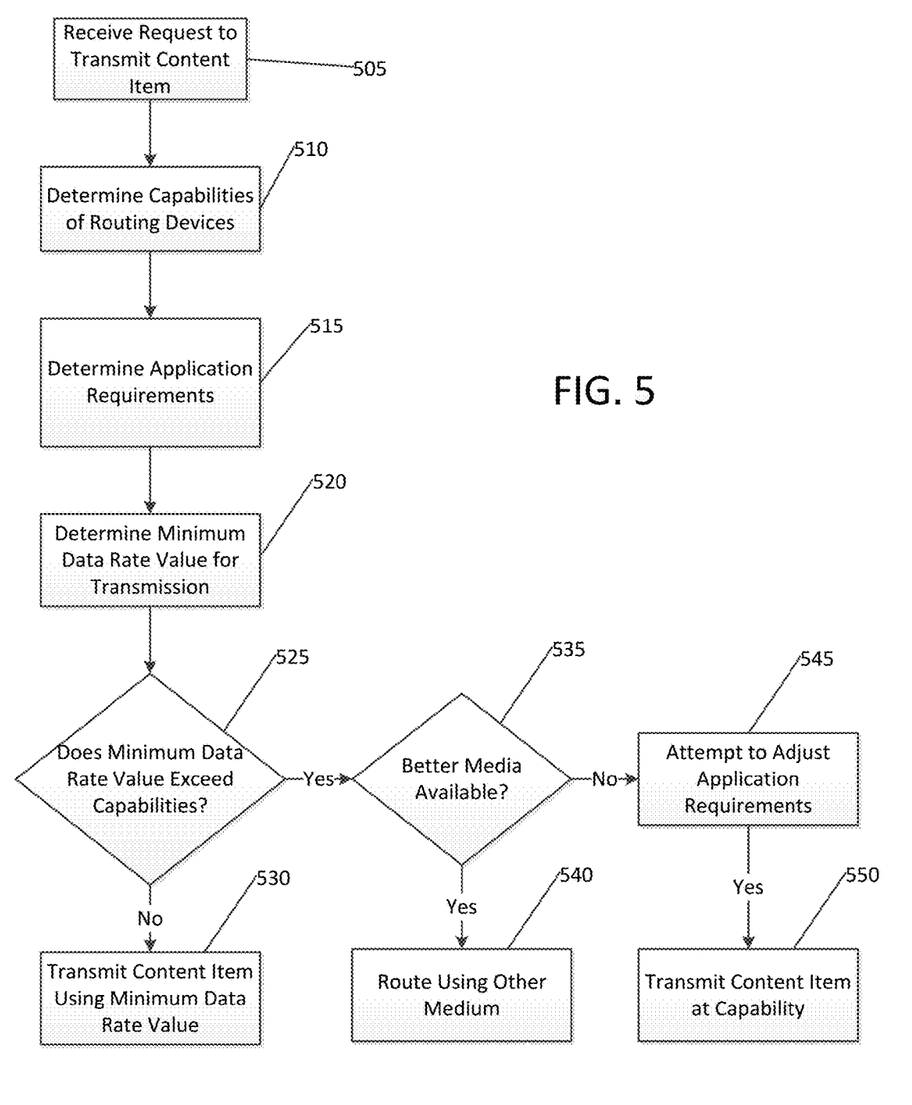
FIG. 5 shows an example method for optimizing the transmission of a content item.

FIG. 5 shows an example method for optimizing the transmission of a content item. A device (such as a content source 405, access point 410, user device 415, or combination thereof) may determine a minimum data rate value for transmitting a content item, and perform further steps as required based on that determination. In some instances, the data rate value may comprise a Modulation and Coding Scheme (e.g., "MCS") value. The MCS value may correspond to a number of spatial streams, a modulation type, a coding method, and/or a transmission frequency range. This may have the advantage of meeting application requirements for transmission while minimizing the impact of transmission upon the network.

At step 505, the device may receive a request to transmit a content item. The request may be a packet from a user device 415 requesting that the system supply a content item from a storage location (e.g., digital storage of a content source 405). For example, the device may receive a data packet requesting that a video file be delivered to a network address corresponding to the user device 415.

At step 510, the device may determine the capabilities of one or more routing devices on the network. The device may first determine what media for transmission exist, what capabilities those media may have, or the capabilities of devices that make use of those media. For example, the device may determine that a content source 405 is connected via a 1 Gb/sec fiber optic connection and a 100 Mb/sec Ethernet connection to an access point 410. The device may further determine that the access point 410 may be connected via an 800 Mb/sec 802.11ac connection and a 1 Gb/sec Ethernet connection to a user device 415. The device may also determine that the access point 410 may only be able to output a total of 1 Gb/sec from all combined outputs. In some instances, the device may determine capabilities for an aggregated a plurality of media. For example, the device may determine that a combination of an 802.11ac connection from a content source 405 to a user device 415 and an Ethernet connection from the content source 405 and the user device 415 may have an effective combined bandwidth of 1.5 Gb/sec. The device may determine any other applicable characteristics of such media or devices (e.g., transcoding ability, current bandwidth available, power draw, etc.).

At step 515, the device may determine application requirements. In some instances, the device may determine application requirements by detecting a quality of service ("QoS") parameter for the content item (such as a QoS parameter associated with DSCP, 802.1q, etc.). The QoS parameter may indicate the requirements for transmitting the content item. For example, a QoS parameter may indicate that the content item should be transmitted with minimum latency. In another example, a QoS parameter may indicate that the content item should be transmitted using maximum bandwidth (e.g., maximum rate of transfer). The QoS parameter may indicate a combination of requirements. For example, the QoS parameter may indicate a maximum allowable latency for a content item and a minimum allowable bandwidth.

Application requirements may also be inferred for a content item. The device may use one or more properties of the content item to determine a type for the content item. One property may be a transmission or destination port for the content item. For example, the device may determine that the content item is directed at a particular User Datagram Protocol ("UDP") port that is associated with online gaming. In another example, the device may determine that the content item is directed at a particular Transmission Control Protocol ("TCP") port associated with VoIP traffic. The device, based on the type, may determine characteristics for transmission. For example, the device may associate a predetermined maximum latency and minimum bandwidth for a content item with a VoIP type. In another example, the device may associate another predetermined maximum latency and minimum bandwidth for a content item with a gaming type.

At step 520, the device may determine a minimum data rate value for transmitting the content item. As data rates increase, a transmission may require more resources or spectrum in order to handle the transmission. Increased data rates may also raise packet error rates, requiring more retransmissions. For example, in a wireless transmission, a higher MCS value may require additional channels and/or antennas, which may also increase the chances of collisions. In wired networks, higher data rates may take up more available bandwidth, such as by requiring more spectrum or channels in a multiplexed environment. By determining the minimum data rate value for the transmission, the device may determine a value that meets the application requirements while minimizing potentially harmful effects to the medium for transmission and/or network.

At step 525, the device may determine whether the minimum data rate value exceeds the capabilities for a default route on the network. Using a method known in the art or described herein, a route may be established for transmitting the content item. The device may have determined the capabilities of one or more media corresponding to the route in step 510. If the minimum data rate value falls within the capabilities of the one or more media, then the one or more routing devices may be capable of transmitting the content item across the one or more media and the content item may be transmitted in step 530. If the minimum data rate value exceeds capabilities, the device may check to see if an alternative medium for transmission is available in step 535.

At step 530, the device may transmit the content item using the minimum data rate value. For example, the device may transmit a VoIP transmission using a relatively small MCS value that reduces latency in an environment with frequent packet collisions while maintaining a minimum level of bandwidth necessary to maintain the VoIP transmission. In another example, a small MCS value may introduce latency due to the time to transmission, so the device may transmit with a larger MCS value. In some instances, a wireless transmission may only utilize a portion of a channel (such as a lower band in a dual-band channel) to transmit the data, which may have the advantage of reducing collisions. In some instances, the portion utilized may be a portion furthest from another channel being utilized by another device. For example, if the device is utilizing channel 6, and another device is utilizing channel 11, but no device is utilizing channel 1, then the device may utilize the lower half of channel 6 in order to reduce the impact of collisions and/or crosstalk with communications on channel 11. In another example, the device may only transmit in a portion of the frequency range for a channel to avoid interference.

At step 535, the device may determine if other media for transmission are available. Though the default route may have been found incapable of handling the transmission in step 525, some other medium for transmission may exist. For example, a virtual reality streaming video transmission may require 300 Mb/sec for transmission. A default route may comprise a MOCA connection from the content source 405 to the access point 410, and an Ethernet connection from the access point 410 to the user device 415. However, the MOCA connection may only be capable of 250 Mb/sec. In some instances, capabilities may be determined for a time window. For example, a capability for a MOCA connection may be determined every 5 minutes due to fluctuations in MOCA capabilities due to interference. Instead, the device may determine at step 535 that a wireless 802.11ad connection from the content source 405 to the user device 415 may exist, and may be capable of 500 Mb/sec. The device may then proceed to route the content item through the better medium in step 540. In other instances, no better medium may be available, so the device may attempt to adjust application requirements in step 545.

At step 540, the device may route using another medium. A preferred medium may be incapable of handling a transmission within requirements. For example, a MOCA connection may be preferred due to its relative stability as compared to wireless transmissions, but the wireless connection may have added bandwidth necessary to meet requirements. The device may then use the minimum data rate value determined in step 520, and route the content item through the other medium in order to meet the application requirements.

At step 545, the device may attempt to adjust application requirements for transmission. In some instances, no medium may be capable of handling the stated application requirements. For instance, no medium may have the bandwidth needed for application requirements corresponding to a high-definition video stream. In another instance, any route may introduce a delay that fails to meet application requirements corresponding to a video call. However, it may be possible to negotiate with an application to change application requirements. The device may communicate with the user device 415 and/or an application requesting the content item to change requirements. For example, the device may request that the video streaming quality be reduced. An application on the user device 415 may then instead request a standard definition video feed. Regardless of whether the requirements are adjusted, the device may transmit the content item according to its capability in step 550.

At step 550, the device may transmit the content item according to its capability. Whether or not requirements were adjusted, the device may attempt to deliver the content item to the user device 415 using the minimum data rate value determined in step 520. This may result in impacted performance or user experience if application requirements are not being met. In some instances, an option may be presented to a user to delay or cancel transmission if requirements cannot be met.

Figure 8:
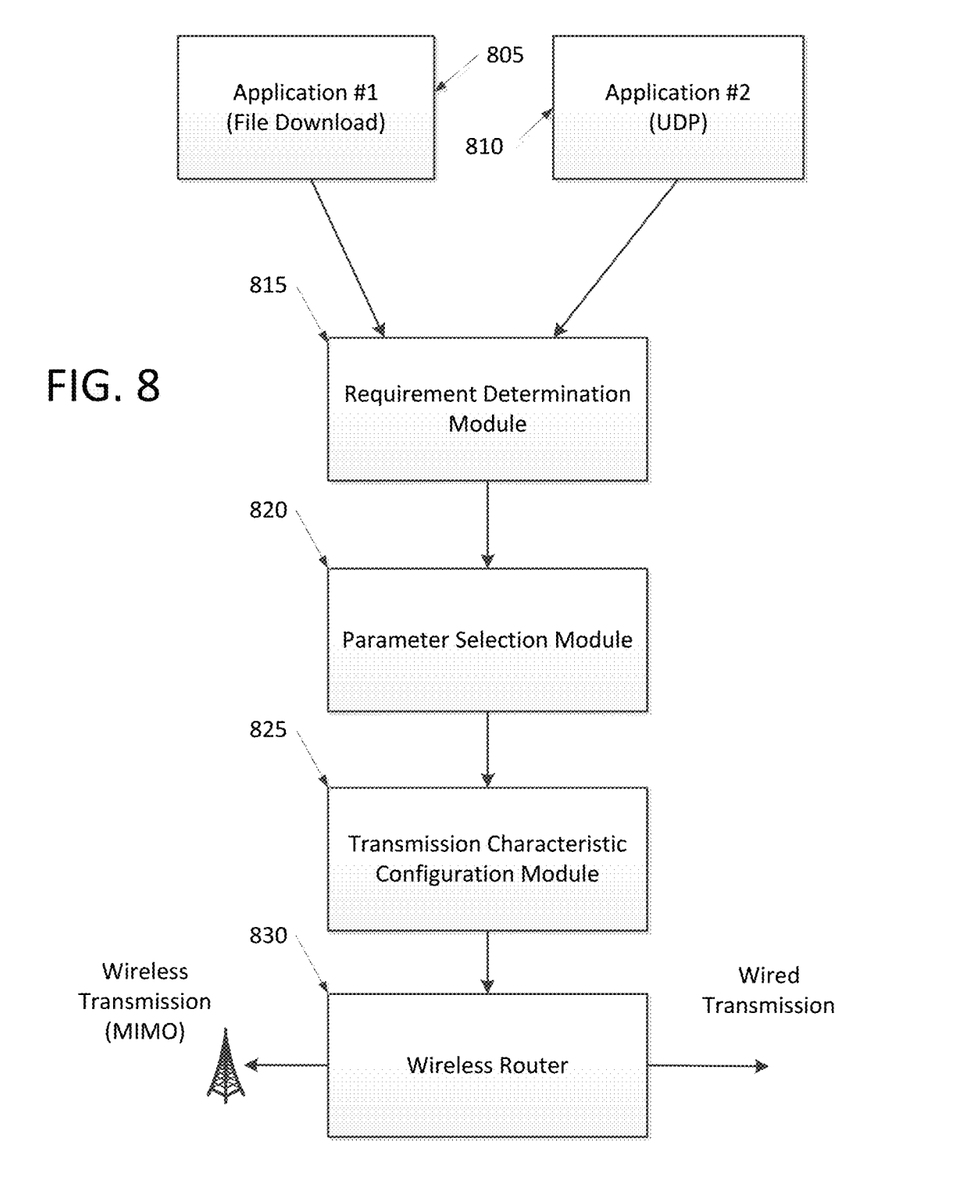
FIG. 8 shows an example system for transmission management.

FIG. 8 shows an example system for transmission management consistent with one or more methods described herein. Transmissions corresponding to different applications may be processed by one or more modules in order to determine optimal transmission characteristics. In some instances, these modules may be hardware and/or software layers operating on a wireless router 830. For example, two applications, a first application 805 and a second application 810, may wish to transmit data. The first application 805 may comprise a file download transmission, which requires that every packet be received reliably. The second transmission may comprise a UDP transmission with minimum speed requirements, such as a video call.

The system may comprise various modules for transmission management. Requirement determination module 815 may analyze packets to determine a course of action. The requirement determination module 815 may determine a course of action based on QOS parameters and/or an associated application for the transmission. For example, the requirement determination module 815 may determine that a transmission corresponds to the first application 805 or the second application 810 based on packet header information. Each application may have associated requirements. For example, file downloads associated with the first application 805 may require as few packets be dropped as possible. In another example, UDP transmissions associated with the second application 810 may require that a minimum throughput is reached, and that as few packets are dropped as possible after exceeding the minimum throughput.

A parameter selection module 820 may determine optimal parameters for the transmission based on requirements determined by the requirement determination module 815. A reliability parameter may specify that high reliability for a transmission is preferred. For example, an MCS value may be selected that is slower, but more reliable, for the first application 805. In another example, an MCS value may be selected that is faster, but less reliable, for the second application 810. If a transmission aggregates packets, such as a packet for application 805 and a packet for application 810, the most stringent requirements may be used. For example, if the first application requires an MCS value of 4 and the second application 810 requires an MCS value of 6, an MCS value of 6 may be used for the aggregated transmission. These parameters may then be applied by a transmission characteristic configuration module 825. For example, the transmission characteristic configuration module 925 may assign a header value indicating a desired MCS value for transmission. In another instance, the transmission characteristic configuration module 825 may configure one or more antennas on the wireless router 830 for transmitting the data associated with the first application or the second application.

After configuration, the transmission may be performed by the wireless router 830. In some instances, the wireless router 830 may be an access point 410. For example, the transmission may be made via a wireless transmission, which may be a multiple-input multiple-output transmission ("MIMO"), using the configured MCS value for associated antenna(s). In another example, the transmission may be made via a wired transmission, such as via transmission over MOCA or wired Ethernet.

Figure 6:
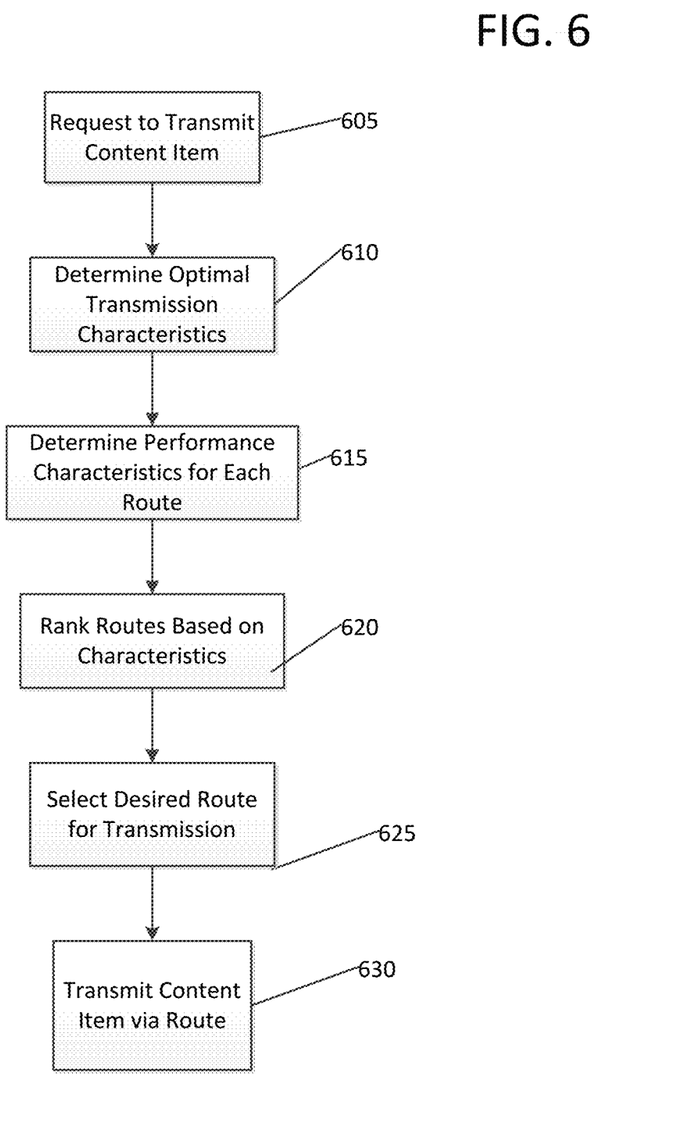
FIG. 6 shows an example method for selecting a route for transmission of a content item.

FIG. 6 shows an example method for selecting a route for transmission of a content item. A device (such as a content source 405, access point 410, user device 415, or combination thereof) may determine a particular route for transmitting a content item. Multiple, alternative media for transmitting a content item may exist within a network. By selecting the media most appropriate for the content item, network performance may be optimized.

At step 605, the device may receive a request to transmit a content item. The request may be a packet from a user device 415 requesting that the system supply a content item from a storage location (e.g., digital storage of a content source 405). For example, the device may receive a data packet requesting that a video file be delivered to a network address corresponding to the user device 415.

At step 610, the device may determine optimal transmission characteristics for the content item. In some instances, the device may detect a quality of service ("QoS") parameter for the content item (such as a QoS parameter associated with DSCP, 802.1q, etc.). The QoS parameter may indicate the requirements for transmitting the content item. For example, a QoS parameter may indicate that the content item should be transmitted with minimum latency. In another example, a QoS parameter may indicate that the content item should be transmitted using maximum bandwidth (e.g., maximum rate of transfer). The QoS parameter may indicate a combination of requirements. For example, the QoS parameter may indicate a maximum allowable latency for a content item and a minimum allowable bandwidth.

Application requirements may also be inferred for a content item. The device may use one or more properties of the content item to determine a type for the content item. One property may be a transmission and/or destination port for the content item. For example, the device may determine that the content item is directed at a particular UDP port that is associated with online gaming. In another example, the device may determine that the content item is directed at a particular TCP port associated with VoIP traffic. The device, based on the type, may determine characteristics for transmission. For example, the device may associate a predetermined maximum latency and minimum bandwidth for a content item with a VoIP type. In another example, the device may associate another predetermined maximum latency and minimum bandwidth for a content item with a gaming type.

At step 615, the device may determine performance characteristics for each route. For example, a content source 405 may be connected to an access point 410 via a fiber optic connection and an Ethernet connection. The fiber optic connection may be capable of 10 Gb/sec, with a latency of 10 ms, the Ethernet connection may be capable of 1 GB/sec with a latency of 4 ms. The content source 405 may also be directly connected to a user device 415 via a MOCA connection with a bandwidth of 100 MB/sec and a latency of 7 ms. The access point may be connected to the user device 415 via an Ethernet connection with a bandwidth of 1 Gb/sec and a latency of 4 ms.

At step 620, the device may rank the routes based on their characteristics. Different combinations of media may be appropriate for different performance characteristics. For example, a gaming service may require 10 MB/s, but may want the lowest latency possible. The MOCA connection of 100 MB/sec meets the bandwidth requirement while only having a latency of 7 ms. If the Ethernet connections were used, it would have a bandwidth of 1 GB/sec, but would have a total latency of 8 ms. The fiber optic connection may have an even higher latency of 10 ms. Thus, the device may rank the MOCA connection as the best route for the low bandwidth, low latency requirements of the gaming service.

In another example, a virtual-reality streaming video service may require a minimum 150 MB/sec of bandwidth and require a latency below 100 ms. The MOCA connection, with a bandwidth of 100 MB/sec, may be insufficient for transmission. Thus, the device may rank the pure Ethernet connection, with 1 Gb/sec of bandwidth and a latency of 8 ms, first, and the fiber-Ethernet connection, with 1 Gb/sec of bandwidth and a latency of 14 ms, second.

Other factors may be considered in the ranking. For instance, some applications may be impacted by dropped packets. For example, a VoIP call may not allow for retransmissions, so dropped packets may degrade audio quality. A first route for a VoIP call may be a WiFi connection with high bandwidth and low latency, but frequently lost packets. A second route may be a MOCA connection with lower bandwidth, higher latency, but far fewer dropped packets relative to the WiFi connection. If the MOCA connection still meets the bandwidth and latency requirements for the VoIP call, the device may rank the MOCA connection higher because it has fewer lost packets. Therefore, packet loss may be one of many other factors considered in order to rank routes.

At step 625, the device may select the desired route for transmission based on the ranking from step 620. The route that is ranked as the best suited for transmission, based on the optimal transmission characteristics for the content item, may be selected for transmitting the content item in step 630.

At step 630, the device may transmit the content item via the selected route.

Figure 7:
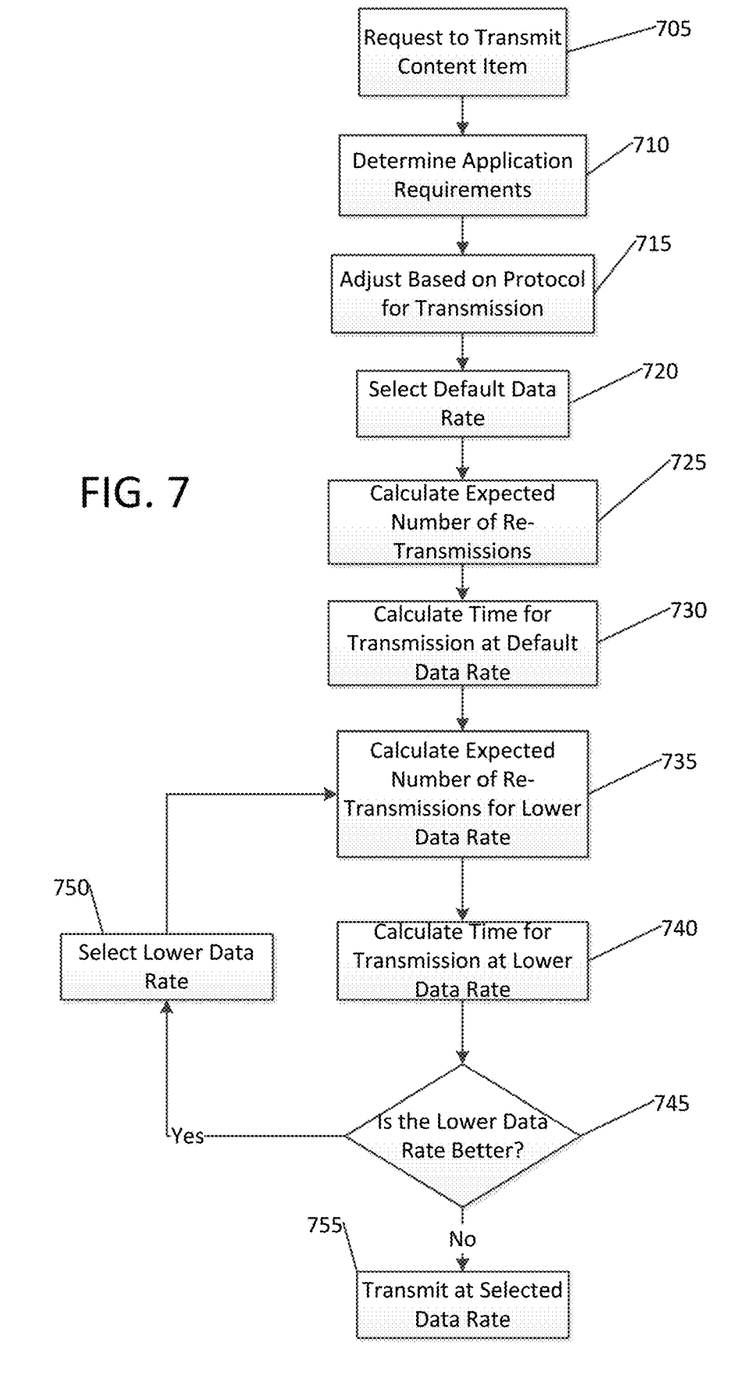
FIG. 7 shows an example method for optimizing transmission speeds.

FIG. 7 shows an example method for determining the best link speed for transmitting a content item based at least in part on packet retransmissions. A device (such as a content source 405, access point 410, user device 415, or combination thereof) may determine a data rate for transmitting a content item. Though a faster data rate for transmission may be available, a content item may require retransmission of some packets if they are lost in transmission. In many instances, such as transmission via a wireless protocol, increased data rates may result in increased retransmissions. These retransmissions may occupy transmission time and lower the effective transmission rate. Thus, in some instances, a higher effective transmission rate may be achieved by lowering the data rate below the highest possible data rate and also lowering the resultant number of retransmissions.

At step 705, the device may receive a request to transmit a content item. The request may be a packet from a user device 415 requesting that the system supply a content item from a storage location (e.g., digital storage of a content source 405). For example, the device may receive a data packet requesting that a video file be delivered to a network address corresponding to the user device 415.

At step 710, the device may determine application requirements. In some instances, the device may detect a QoS parameter for the content item (such as a QoS parameter associated with DSCP, 802.1q, etc.). The QoS parameter may indicate the requirements for transmitting the content item. For example, a QoS parameter may indicate that the content item should be transmitted with minimum latency. In another example, a QoS parameter may indicate that the content item should be transmitted using maximum bandwidth (e.g., maximum rate of transfer). The QoS parameter may indicate a combination of requirements. For example, the QoS parameter may indicate a maximum allowable latency for a content item and a minimum allowable bandwidth.

Application requirements may also be inferred for a content item. The device may use one or more properties of the content item to determine a type for the content item. One property may be a transmission and/or destination port for the content item. For example, the device may determine that the content item is directed at a particular UDP port that is associated with online gaming. In another example, the device may determine that the content item is directed at a particular TCP port associated with VoIP traffic. The device, based on the type, may determine characteristics for transmission. For example, the device may associate a predetermined maximum latency and minimum bandwidth for a content item with a VoIP type. In another example, the device may associate another predetermined maximum latency and minimum bandwidth for a content item with a gaming type.

At step 715, the device may adjust based on the protocol selected for transmission. Some protocols, such as TCP, may retransmit a packet that is lost in transmission. Thus, all packets lost may result in a retransmission. Other protocols, such as UDP, do not retransmit lost packets. The requirements for a transmission that requires a small number of dropped packets, but uses UDP, may be adjusted to compensate for the fact that all dropped packets are lost. This may require that any requirements for dropped packets be strictly enforced. If retransmissions are allowed, however, dropped packets may be acceptable so long as bandwidth exists for retransmission. For these instances, a requirement that packets not be dropped may be eliminated, and dropped packets may be instead later considered as they impact bandwidth requirements through retransmission.

At step 720, the device may select a default data rate for the transmission. In some instances, the default link speed may be the fastest possible data rate. The default link speed may be determined based on hardware capabilities and/or the operating environment according to known methods.

At step 725, the device may determine an expected number of retransmissions based on the default link speed. The expected number of retransmissions may be determined based on an expected number of retransmissions for a given speed and/or operating environment. In some instances, the expected number of retransmissions may be determined based on the number of retransmissions that have occurred at the selected data rate historically for the device. For example, the device may determine that 300 Mb/sec transmissions have had a 5% retransmission rate over the past 4 hours. In other instances, the expected number of retransmissions may be determined based on a table of values indicating the expected number of retransmissions based on the data rate and an interference level detected by the device on the medium for transmission. For example, a table may indicate that a 200 Mb/sec transmission with a 12 dB signal-to-noise ratio (SNR) has a 3% retransmission rate.

At step 730, the device may determine the expected time for transmission at the default (currently selected) data rate. The expected time for transmission may be a function of the inverse of the data rate plus the time taken to conduct retransmissions. One algorithm for calculating the time of transmission is as follows:

$$X + Y = Z;$$

wherein $$X = \frac{\text{<Number of Packets to Transmit>}}{\text{<Data Rate>}}$$

$$Y = \frac{\text{<Percentage of Retransmissions>} * \text{<Number of Packets to Transmit>}}{\text{<Data Rate>}} \text{ and}$$

$$Z = \text{Total Time for Transmission}$$

At step 735, the device may determine the expected number of retransmissions for the content item at a data rate lower than the currently selected rate. The device may determine a data rate at a step below the currently selected data rate (initially, the default data rate). For example, if the currently selected data rate is 300 Mb/sec, the device may determine the expected number of retransmissions for a data rate of 290 Mb/sec. The amount lowered may be based on considerations for the efficiency of the algorithm (larger jumps may reduce iterations of the method) and transmission capabilities (only certain transmission speeds may be supported for transmission). The expected number of retransmissions may then be determined according to the method as described in step 725.

At step 740, the device may determine the time for transmission at the lower data rate. The expected time for transmission may be determined using an algorithm such as described in step 730.

At step 745, the device may determine if the lower data rate is more efficient than the selected data rate. Though the data rate is lower, the time for transmission may be shorter due to a reduced number of retransmissions. If this is the case, the device may proceed to determine if an even lower data rate would be faster at step 750. If the lower data rate does take longer to transmit, the device may determine that the currently selected data rate is the relatively "best" data rate and transmit the content item at step 755.

In some examples, the device may also determine if the lower data rate is better based on the application requirements. A lower data rate may have a longer expected time for transmission, but may require fewer retransmissions. If a protocol for a content item does not allow for retransmissions, and dropped packets are undesirable, the lower data rate may be better because it may cause fewer dropped packets. A minimum bandwidth may also be required for transmission, regardless of retransmissions. For example, streaming video may require high bandwidth and may not allow retransmissions, but may be tolerant of dropped packets. Thus, a higher data rate may be desired, even though it may produce a substantial number of dropped packets.

At step 750, the device may select the lower data rate. Since the lower data rate was more efficient than the previously selected, faster data rate, the device may be able to assume that a data rate that is at least as slow as the lower data rate should be used. The device may then select the lower data rate as the new selected data rate, and repeat steps 735 through 745 against an even lower data rate to determine if the even lower data rate would be even more efficient than the lower data rate. Thus, the device may iteratively lower the data rate in steps 735 through 750 until the most efficient data rate is found.

At step 755, the device may transmit the content item at the selected data rate. This may be the data rate determined to have the shortest expected time for transmission according to steps 705 through 745.

The methods and features recited herein may be implemented through any number of computer readable media that are able to store computer readable instructions. Examples of computer readable media that may be used include RAM, ROM, Electrically Erasable Programmable Read-Only Memory (EEPROM), flash memory or other memory technology, CD-ROM, DVD, or other optical disk storage, magnetic cassettes, magnetic tape, magnetic storage, and the like.

Additionally or alternatively, in at least some embodiments, the methods and features recited herein may be implemented through one or more Integrated Circuits (ICs). An IC may, for example, be a microprocessor that accesses programming instructions or other data stored in a ROM. In some embodiments, a ROM may store program instructions that cause an IC to perform operations according to one or more of the methods described herein. In some embodiments, one or more of the methods described herein may be hardwired into an IC. For example, an IC may comprise an Application Specific Integrated Circuit (ASIC) having gates and/or other logic dedicated to the calculations and other operations described herein. In still other embodiments, an IC may perform some operations based on execution of programming instructions read from ROM or RAM, with other operations hardwired into gates or other logic. Further, an IC may be configured to output image data to a display buffer.

Although specific examples of carrying out the disclosure have been described, those skilled in the art will appreciate that there are numerous variations and permutations of the above-described apparatuses and methods that are contained within the spirit and scope of the disclosure as set forth in the appended claims. Additionally, numerous other embodiments, modifications, and variations within the scope and spirit of the appended claims may occur to persons of ordinary skill in the art from a review of this disclosure. Specifically, one or more of the features described herein may be combined with any or all of the other features described herein.

The various features described above are merely non-limiting examples, and may be rearranged, combined, subdivided, omitted, and/or altered in any desired manner. For example, features of the servers may be subdivided among multiple processors and/or computing devices. The true scope of this patent should only be defined by the claims that follow.

What is claimed:

1. A method comprising:
   determining, by a computing device and based on a first data rate and a first expected number of packet retransmissions for the first data rate, a first expected time of wireless transmission of a content item;

determining, by the computing device and based on a second data rate for the content item and a second expected number of packet retransmissions for the second data rate, a second expected time of wireless transmission of the content item;

determining, by the computing device and based on a comparison of the first expected time of wireless transmission and the second expected time of wireless transmission, to cause wireless transmission, based on the second data rate, of the content item; and causing, by the computing device, wireless transmission, based on the second data rate, of the content item.

2. The method of claim 1, wherein the first data rate is greater than the second data rate.

3. The method of claim 2, further comprising:
determining, based on a maximum data rate associated with a protocol, the first data rate; and
determining, based on a minimum data rate associated with the protocol, the second data rate.

4. The method of claim 1, further comprising:
determining, based on a third data rate and a third expected number of packet retransmissions for the third data rate, a third expected time of transmission of the content item, wherein the second data rate exceeds the third data rate; and
wherein the determining to cause transmission of the content item based on the second data rate further comprises determining that the third expected time of transmission is greater than the second expected time of transmission.

5. The method of claim 1, further comprising:
determining one or more application requirements associated with the content item,
wherein the determining to cause transmission of the content item based on the second data rate further comprises determining that the second data rate meets the one or more application requirements.

6. The method of claim 5, further comprising:
adjusting the one or more application requirements based on a transmission protocol associated with the content item.

7. A method comprising:
determining, by a computing device and based on a reliability parameter corresponding to one or more application requirements associated with a content item, a first medium for transmitting the content item;
determining, by the computing device and based on the one or more application requirements, a minimum data rate value for transmitting the content item;
comparing, by the computing device, the minimum data rate value and a capability of the first medium;
determining, by the computing device and based on the comparing, to cause transmission of the content item via a second medium; and
causing, by the computing device, transmission, via the second medium, of the content item.

8. The method of claim 7, wherein the determining to cause transmission of the content item is based on determining that a second capability of the second medium is greater than the minimum data rate value.

9. The method of claim 7, further comprising:
determining that the minimum data rate value is greater than a second capability of the second medium; and
adjusting, prior to the causing transmission of the content item via the second medium and based on determining that the minimum data rate value is greater than the second capability of the second medium, the one or more application requirements.

10. The method of claim 9, wherein the adjusting the one or more application requirements comprises:
sending a request for an application to change the one or more application requirements.

11. The method of claim 10, wherein the sending the request comprises sending a message requesting that the application reduce a quality of a video stream of the content item.

12. The method of claim 7, wherein the first medium is a wired medium, and wherein the second medium is a wireless medium.

13. The method of claim 7, further comprising:
determining a ranking of a plurality of possible routes for the content item,
wherein the determining to cause transmission via the second medium is further based on the ranking.

14. The method of claim 13, wherein the determining the ranking of the plurality of possible routes for the content item comprises:
determining performance characteristics for each route of the plurality of possible routes; and
ranking the plurality of possible routes based on the one or more application requirements and the performance characteristics.

15. The method of claim 14, wherein at least one route of the plurality of possible routes comprises a wired path, and at least one route of the plurality of possible routes comprises a wireless path.

16. A method comprising:
determining, by a computing device and based on a first data rate and a first expected number of packet retransmissions for the first data rate, a first expected time of transmission of a content item;
determining, by the computing device and based on a second data rate and a second expected number of packet retransmissions for the second data rate, a second expected time of transmission of the content item;
determining, by the computing device and based on comparing the first expected time of transmission and the second expected time of transmission, to cause transmission of the content item based on the second data rate;
determining, by the computing device and based on comparing the second data rate and a capability of a first medium, to cause transmission of the content item via a second medium; and
causing, by the computing device, transmission, via the second medium and based on the second data rate, of the content item.

17. The method of claim 16, wherein the first data rate is associated with a first modulation parameter, wherein the second data rate is associated with a second modulation parameter, and wherein the comparing the second data rate and the capability of the first medium comprises determining that the first medium is unsuitable for the second modulation parameter.

18. The method of claim 17, further comprising:
determining one or more application requirements associated with the content item,
wherein the determining to cause transmission of the content item via the second medium further comprises determining that the second data rate meets the one or more application requirements.

19. The method of claim 18, further comprising:
determining a ranking of a plurality of possible routes for the content item,
wherein the determining to cause transmission of the content item via the second medium is further based on the ranking.

20. The method of claim 19, further comprising:
determining performance characteristics for each route of the plurality of possible routes,
wherein the determining the ranking comprises ranking, based on the application requirements and the performance characteristics, the plurality of possible routes.

* * * * *

UNITED STATES PATENT AND TRADEMARK OFFICE
CERTIFICATE OF CORRECTION

PATENT NO. : 10,432,494 B2
APPLICATION NO. : 15/409083
DATED : October 1, 2019
INVENTOR(S) : Gilson et al.

Page 1 of 1

It is certified that error appears in the above-identified patent and that said Letters Patent is hereby corrected as shown below:

In the Specification

Column 10, Detailed Description, Line 6:
Please delete "925" and insert --825-- therefor Signed and Sealed this
Eighth Day of June, 2021

Drew Hirshfeld
*Performing the Functions and Duties of the
Under Secretary of Commerce for Intellectual Property and
Director of the United States Patent and Trademark Office*